Patented Jan. 7, 1947

2,413,856

UNITED STATES PATENT OFFICE 2,413,856

VINYL POLYMER PLASTICIZED WITH ETHYLENE DIAMINE TETRAACETIC ACID ESTER

Frederick C. Bersworth, Verona, N. J.

No Drawing. Application July 17, 1943,
Serial No. 495,207

6 Claims. (Cl. 260—36)

This invention relates to the plasticizing and modifying of certain vinyl compounds of a resinous nature, and more particularly to the incorporation of esters of polyamino-polyacetic acids as modifying agents in vinyl chloride polymers, vinyl chloride-vinyl acetate copolymers, vinyl chloride-vinylidine chloride copolymers, and vinyl butyral polymers.

In the preparation of useful products of these vinyl polymers and copolymers, it is advisable to add a softening or plasticizing agent. But the addition of such agents generally decreases the tensile strength of the finished product to a considerable degree; furthermore, each such agent decreases the tensile strength to a different degree. The plasticizing or softening agent must in any event be compatible with the polymer, and must not bleed out when the polymer is worked.

It is an object of this invention to set forth a class of plasticizers for the above-mentioned vinyl polymers and copolymers which have much less adverse effect than do ordinary plasticizers on the tensile strengths of products made of such polymers and copolymers.

Other objects will appear in the following detailed explanation of the invention.

Briefly, these objects may be accomplished by the incorporation of an ester of a polyamino polyacetic acid with the said vinyl polymers and copolymers.

The esters which may be advantageously incorporated with the said vinyl polymers and copolymers to obtain the desired results may be defined in terms of the amino acid and in terms of the alcohol used for esterification. The method for preparing these esters is set forth in detail in my copending application, Ser. No. 491,670, filed June 21, 1943.

The polyamino polyacetic acid may be broadly defined by the formula:

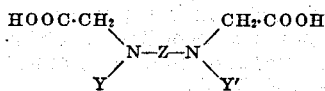

wherein Y and Y' are the same or different and are either hydrogen, —CH$_2$·COOH, an alkyl group, a cycloalkyl group, or an alkylol group; and Z is an alkylene group, an alkylene-ether group, an alkylol group, or a polyalkylene-amine group in which latter case the amino nitrogen atoms intermediate the polyalkylene chain are attached either to a hydrogen atom or to a —CH$_2$·COOH group. Of particular value in the present invention are the esters of the amino tetra (or higher) acetic acids, i. e. of those acids which correspond to the above formula wherein Y and Y' are —CH$_2$·COOH, and also wherein Z is an alkylene or a polyalkylene-amine group (i. e. >N—Z—N< is an alkylene-polyamine radical or a polyalkylene-polyamine radical).

Esters formed from any alcohol containing at least one esterifiable —OH group attached to a carbon atom which is not part of a benzene ring may be used advantageously. The esterification, however, is preferably complete as to all the free carboxylic acid groups of the amino acid, and must be complete as to at least two of them and there must, by definition, be at least two such free carboxylic acid groups. The esters used in the present process will therefore correspond to the foregoing formula except for the replacement of hydrogens of the carboxylic acid groups —COOH by R—, R— being the radical of an alcohol ROH.

The resinous vinyl compounds with which the above defined esters have a beneficial plasticizing effect include the polyvinyl chloride polymers and the polyvinyl chloride copolymers. Specifically included are the straight polymers

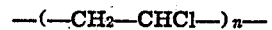

such as "Koroseal," the vinyl acetate-vinyl chloride copolymers, also called polyvinyl chloride-acetate, the vinyl chloride-vinylidine chloride copolymers, and polyvinyl butyral.

The following is a general method for incorporating the ester of the polyamino polycarboxylic acid in the resin. The vinyl resin is first dissolved in a volatile solvent thereof inert to both the resin and the ester and which is preferably capable of dissolving both substances. About a 5% solution of the resin has been found suitable for most practical operations. To this is added the ester in the desired amount which is preferably about one third of the weight of the resin.

After thorough incorporation, the resulting composition may be sheeted out and dried by evaporation of the solvent, or otherwise manipulated to form the desired final product. This composition, before evaporation of the solvent, may be fairly liquid or may be jelly-like, depending principally upon the amount of solvent used.

It is to be understood that any quantity of the ester will have a softening effect and as the quantity of ester added to a given weight of resin is increased, the softer the resin will become until it finally dissolves. The quantity of ester used will therefore be in accordance with the characteristics of the final product desired for a particular purpose, but as stated above, about ⅓ by weight of the ester based on the weight of resin will give satisfactory results for most ordinary purposes.

For evaluation and comparison purposes, the more or less jelly-like mixture of resin and ester in solution, prepared as above described, is drawn to a predetermined thickness on a glass plate, thus forming a film which will dry down to about ⅟₃₀ the thickness originally measured. In the examples which follow the films were made .03 inch thick when in solution and were dried down to .001 inch when dry. These dry films were removed and part of them were milled on a two roll mill to ascertain the properties of the treated resin. The remainder were then tested for per cent elongation and tensile strength at these elongations after having been conditioned in a room at 65% relative humidity at 70° F. for four hours.

This invention is not limited to the preferred method of incorporating the ester. For instance, the resin and the ester may be added together and the mixture sheeted on a two-roll mill without the use of any solvent. Similarly any method which serves to incorporate the ester in the resin in a satisfactory manner is included in this invention.

In order to compare the effect of adding the esters of polyamino-polycarboxylic acids referred to herein with that of well-known plasticizers, four of the most widely used plasticizers were selected and incorporated in exactly the same manner and relative amounts as the said esters. To facilitate comparisons between the physical properties of the final products, tables are given in Examples I, II, and III in which each of the plasticizers is designated by a letter as follows:

A represents the tetrabutyl ester of ethylene diamine tetraacetic acid.
B represents dibutyl sebacate.
C represents tricresyl phosphate.
D represents triethylene glycol di-2-ethyl butyrate.
E represents triethylene glycol di-2-ethyl hexate.

Example I

To 570 grams of mesityl oxide were added 30 grams of polyvinyl chloride. To the resulting solution 10 grams of the tetrabutyl ester of ethylene diamine tetraacetic acid were added. The same general procedure of forming films as outlined above was then followed. The following is a table of the results obtained on testing representative samples:

|  | A | B | C | D | E |
|---|---|---|---|---|---|
| Percent plasticizer [1] | 33 | 33 | 33 | 33 | 33 |
| Tests: |  |  |  |  |  |
| Tensile lb./sq. in. | 6,930 | 2,300 | 2,000 | 1,700 | 3,200 |
| Elongation percent | 160 | 170 | 160 | 185 | 290 |
| Compatibility do | 100 | 100 | 100 | 100 | 100 |
| Spew | 0 | 0 | 0 | 0 | 0 |

[1] Based on weight of resin.

Example II

Following the same procedure as in Example I, polyvinyl chloride-acetate (vinyl chloride-vinyl acetate copolymer) was used as the resin. Results of tests on representative products thereof were as follows:

|  | A | B | C | D | E |
|---|---|---|---|---|---|
| Percent plasticizer [1] | 33 | 33 | 33 | 33 | 33 |
| Tests: |  |  |  |  |  |
| Tensile lb./sq. in. | 3,000 | 370 | 2,600 | 600 | 1,400 |
| Elongation percent | 320 | 320 | 250 | 335 | 265 |
| Compatibility do | 100 | 100 | 100 | 100 | 100 |
| Spew | 0 | 0 | 0 | 0 | 0 |

[1] Based on weight of resin.

Example III

Following the same procedure as in Examples I and II, but using polyvinyl butyral as the resin, the following results were obtained in testing representative samples:

|  | A | B | C | D | E |
|---|---|---|---|---|---|
| Percent plasticizer [1] | 33 | 33 | 33 | 33 | 33 |
| Tests: |  |  |  |  |  |
| Tensile lb./sq. in. | 4,800 | 3,700 | 3,600 | 3,700 | 4,700 |
| Elongation percent | 480 | 345 | 345 | 320 | 345 |
| Compatibility do | 100 | 100 | 100 | 100 | 100 |
| Spew | 0 | 0 | 0 | 0 | 0 |

[1] Based on weight of resin.

Example IV

Using polyvinyl chloride as the resin and the tetra-isopropyl ester of ethylene diamine tetraacetic acid as the ester, and following the same procedure of preparing and testing films as already described, the following results were obtained on testing representative samples:

Per cent of plasticizer [1] ......................... 33
Tests:
    Tensile .................... lb./sq. in.-- 4,760
    Elongation ................ per cent-- 208
    Compatibility ............ do ---- 100
    Spew ................................ None

[1] Based on weight of resin.

From the foregoing examples, it may readily be seen that the incorporation of the herein defined esters of polyamino polycarboxylic acids with the vinyl polymers herein set forth serves not only to plasticize those polymers but also to yield a product with a tensile strength greater than that encountered when ordinary plasticizers are used.

I claim:

1. A plasticized resinous product comprising a vinyl compound selected from the group consisting of vinyl chloride homopolymers, vinyl chloride-vinyl acetate copolymers, vinyl chloride-vinylidene chloride copolymers, and vinyl butyral polymers, and a tetra-ester of ethylene diamine tetraacetic acid.

2. The product of claim 1 wherein said ester is the tetrabutyl ester of ethylene diamine tetraacetic acid.

3. A plasticized resinous product comprising a vinyl compound selected from the group consisting of vinyl chloride homopolymers, vinyl chloride-vinyl acetate copolymers, vinyl chloride-vinylidene chloride copolymers, and vinyl butyral polymers, and an ester of ethylene diamine tetraacetic acid; said ester being at least a di-ester.

4. The product according to claim 3 wherein said vinyl compound is a vinyl chloride polymer —($-CH_2-CHCl-$)$_n$.

5. The product according to claim 3 wherein said vinyl compound is a vinyl chloride-vinyl acetate copolymer.

6. The product according to claim 3 wherein said vinyl compound is a vinyl butyral polymer.

FREDERICK C. BERSWORTH.